United States Patent
Kim et al.

(10) Patent No.: US 6,459,834 B1
(45) Date of Patent: Oct. 1, 2002

(54) APPARATUS FOR MANUFACTURING LONG PERIOD FIBER GRATINGS WITH LOW DEPENDENCE ON POLARIZATION AND LONG PERIOD FIBER GRATINGS MANUFACTURED BY THE SAME

(75) Inventors: Se-Yoon Kim, Anyang (KR); Min-Sung Kim, Sungnam (KR); Shin-Young Yoon, Suwon (KR)

(73) Assignee: Samsung Electronics, Co., Ltd., Suwon (KR)

( * ) Notice: Subject to any disclaimer, the term of this patent is extended or adjusted under 35 U.S.C. 154(b) by 186 days.

(21) Appl. No.: 09/621,008

(22) Filed: Jul. 20, 2000

(30) Foreign Application Priority Data

Jul. 28, 1999 (KR) ........................ 30833/1999

(51) Int. Cl.[7] ................................................ G02B 6/34
(52) U.S. Cl. ........................ 385/37; 385/11; 385/136; 385/137; 385/123
(58) Field of Search ................................ 385/43, 37, 11, 385/42, 46, 48, 50, 123, 96, 10, 136, 137

(56) References Cited

U.S. PATENT DOCUMENTS

| | | | | |
|---|---|---|---|---|
| 4,807,950 A | * | 2/1989 | Glenn et al. | 385/37 X |
| 4,900,119 A | * | 2/1990 | Hill et al. | 385/37 X |
| 5,502,786 A | | 3/1996 | Inniss et al. | 385/123 |
| 5,528,716 A | | 6/1996 | Inniss et al. | 385/123 |
| 5,559,907 A | | 9/1996 | Inniss et al. | 385/11 |
| 5,625,723 A | | 4/1997 | Dragone et al. | 385/11 |
| 5,805,751 A | * | 9/1998 | Kewitsch et al. | 385/43 |
| 5,875,272 A | * | 2/1999 | Kewitsch et al. | 385/37 |
| 5,881,187 A | | 3/1999 | Modavis | 385/37 |
| 6,169,830 B1 | * | 1/2001 | Kewitsch et al. | 385/37 |
| 6,236,782 B1 | * | 5/2001 | Kewitsch et al. | 385/43 |

FOREIGN PATENT DOCUMENTS

| | | | |
|---|---|---|---|
| WO | WO 99/45417 | 9/1999 | 385/37 X |
| WO | WO 00/08500 | 2/2000 | 385/37 X |

OTHER PUBLICATIONS

"Birefringence reduction in side-written photoinduced fiber devices by a dual-exposure method" by A. M. Vengsarkar, Q. Zheng, D. Inniss, W.A. Reed, P. J. Lemaire and S. G. Kosinski, Aug. 1994, pp. Opt. Lett. 19, 1260–1262.

* cited by examiner

*Primary Examiner*—Brian Healy
(74) *Attorney, Agent, or Firm*—Robert E. Bushnell, Esq.

(57) ABSTRACT

An apparatus for manufacturing long period fiber gratings with low polarization dependence, and a long period fiber grating manufactured by the apparatus, are provided. This apparatus includes an optical fiber, one end of which has been rotated at least once with respect to the other end, an ultraviolet laser source, and an amplitude mask disposed over the optical fiber, for transmitting light emitted from the ultraviolet laser source at periodic distance intervals. In the manufacture of long period fiber gratings, the refractive index of an optical fiber core is perturbed by irradiating UV light to a twisted optical fiber or by irradiating UV light to an optical fiber which is rotating, so that isotropic perturbations in refractive index can be made when it is seen from the total length of the optical fiber.

24 Claims, 5 Drawing Sheets

APPARATUS FOR MANUFACTURING LONG PERIOD FIBER GRATINGS WITH LOW DEPENDENCE ON POLARIZATION AND LONG PERIOD FIBER GRATINGS MANUFACTURED BY THE SAME

CLAIM OF PRIORITY

This application makes reference to, incorporates the same herein, and claims all benefits accruing under 35 U.S.C. §119 from my application APPARATUS FOR A MANUFACTURING LONG PERIOD OPTICAL FIBER GRATINGS HAVING LESS DEPENDENCE ON POLARIZATION AND LONG PERIOD OPTICAL FIBER GRATINGS A MANUFACTURED BY THE SAME filed with the Korean Industrial Property Office on Jul. 28, 1999 and there duly assigned Ser. No. 30833/1999.

BACKGROUND OF THE INVENTION

1. Field of the Invention

The present invention relates to an apparatus for manufacturing long period fiber gratings with low polarization dependence, and long period fiber gratings manufactured by the same.

2. Description of the Related Art

It is known that an induction of perturbations in the refractive index of an optical fiber core using ultraviolet (UV) laser induces birefringence within an optical fiber due to anisotropic perturbations in the refractive index from the viewpoint of the cross-section of the core. For example, A. M. Vengsarkar et al., "Birefringence reduction in side-written photoinduced fiber devices by a dual exposure method", *Opt. Lett.* 19, 1260–1262, (1994), concluded that birefringence is due to geometrical asymmetry in respect of the manufacturing conditions for irradiating UV laser to the lateral side of an optical fiber. The refractive index of the core of an optical fiber is generally perturbed along the direction of irradiation of UV light.

Fiber gratings, which are fabricated by perturbations in the refractive index of an optical fiber core due to the irradiation of UV light, also use an asymmetrical irradiation method in certain manufacturing circumstances. Thus, polarization dependency is generated. In particular, the polarization dependency becomes serious in the case of long period fiber gratings which require a refractive index perturbation which is about ten times greater than that for fiber Bragg gratings or short period fiber gratings. This characteristic causes a change in insertion loss due to the polarization of a device, that is, a polarization dependent loss (PDL) or polarization mode dispersion (PMD), so that long period fiber gratings may not be suitable for optical communication elements. In other words, irradiation of UV light onto only one side of an optical fiber induces a birefringence phenomenon in which the optical fiber has different refractive indices along its axis, so that long period fiber gratings have polarization dependency.

Upon optical transmission, the polarization-dependent loss of long period fiber gratings increases as a loss peak increases. Therefore, a long period fiber grating with a large loss peak has a significantly large polarization-dependent loss. In order to reduce the large polarization-dependent loss, a reduction in the polarization dependence of long period fiber gratings is required.

Examples of methods of manufacture of fiber gratings of the conventional art are seen in the following U.S. patents. U.S. Pat. No. 5,502,786, to Inniss et al., entitled METHOD OF FORMING PHOTO-INDUCED DEVICE AND PRODUCT, U.S. Pat. No. 5,528,716, to Inniss et al., entitled METHOD OF DETERMINING AND INVESTIGATING THE PHYSICAL STRUCTURE OF A LIGHT GUIDING BODY, and U.S. Pat. No. 5,559,907, to Inniss et al., entitled METHOD OF CONTROLLING POLARIZATION PROPERTIES OF A PHOTO-INDUCED DEVICE IN AN OPTICAL WAVEGUIDE AND METHOD OF INVESTIGATING STRUCTURE OF AN OPTICAL WAVEGUIDE, describe methods of controlling polarization properties of photoinduced devices. Inniss et al. '786, for example, describes the fiber optic grating written by exposing one side of the waveguide to light, then exposing the unexposed side to light to impart a desired birefringence.

U.S. Pat. No. 5,625,723, to Dragone et al., entitled METHOD FOR REDUCING BIREFRINGENCE IN OPTICAL GRATINGS, describes a method for reducing birefringence in optical gratings which has a plurality of waveguides, in which the different waveguides are irradiated for different periods of time.

U.S. Pat. No. 5,881,187, to Modavis, entitled OPTICAL WAVEGUIDE FIBER BRAGG GRATING, describes a method for side-writing Bragg gratings with minimal birefringence. In this method, the intrinsic slow axis of the waveguide is oriented relative to the polarization of the light beam to minimize the birefringence.

SUMMARY OF THE INVENTION

It is therefore an object of the present invention to provide an improved long period fiber grating.

A further object of the invention is to provide a long period fiber grating with reduced polarization dependent loss.

A yet further object of the invention is to provide a long period fiber grating with reduced variation in refractive index across the fiber.

It is a still further object to provide an improved apparatus and method for manufacturing a long period fiber grating.

Another object of the invention is to provide an apparatus and method which reduce polarization dependent loss in manufactured long period fiber grating.

Accordingly, the present invention provides an apparatus for manufacturing long period fiber gratings with low polarization dependence, in which ultraviolet (UV) light is irradiated after one end of an optical fiber is rotated at least once with respect to the other end thereof.

The present invention also provides an apparatus for manufacturing long period fiber gratings with low polarization dependence, in which UV light is irradiated to an optical fiber, both ends of which are rotated at the same speed.

The present invention also provides an apparatus for manufacturing long period fiber gratings with low polarization dependence, in which UV light is irradiated to an optical fiber, both ends of which are fixed, and UV light which has passed through the optical fiber is axially reflected to be re-irradiated to the optical fiber.

The present invention also provides a long period fiber grating with low polarization dependence, which is manufactured by the manufacturing apparatus.

Specifically, in one embodiment, the present invention provides an apparatus for manufacturing optical fiber gratings, the apparatus including: an optical fiber, one end of which has been rotated at least once with respect to the other end; an ultraviolet laser source; and an amplitude mask disposed over the optical fiber, for transmitting light emitted from the ultraviolet laser source at periodic distance intervals.

In another embodiment, the present invention provides an apparatus for manufacturing fiber gratings, the apparatus including: an optical fiber holder for rotating both ends of an optical fiber at the same speed while supporting both ends of the optical fiber; an ultraviolet laser source; and an amplitude mask disposed over the optical fiber which is being rotated by the optical fiber holder, for transmitting ultraviolet laser light emitted from the ultraviolet laser source to the optical fiber at periodic distance intervals.

In another embodiment, the present invention provides an apparatus for manufacturing long period fiber gratings, the apparatus including: an ultraviolet laser source; an amplitude mask disposed over an optical fiber, for transmitting light emitted from the ultraviolet laser source to the optical fiber at periodic distance intervals; and reflecting bodies installed on the opposite of the optical fiber to the amplitude mask, for reflecting light which has passed through the optical fiber.

In another embodiment, the present invention provides a long period fiber grating manufactured by a method including: twisting an optical fiber at least once; irradiating light to the twisted optical fiber at periodic distance intervals; and untwisting the twisted optical fiber.

The present invention also provides a long period fiber grating manufactured by a method including: rotating both ends of an optical fiber at the same speed; and irradiating light to the optical fiber which is rotating, at periodic distance intervals.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
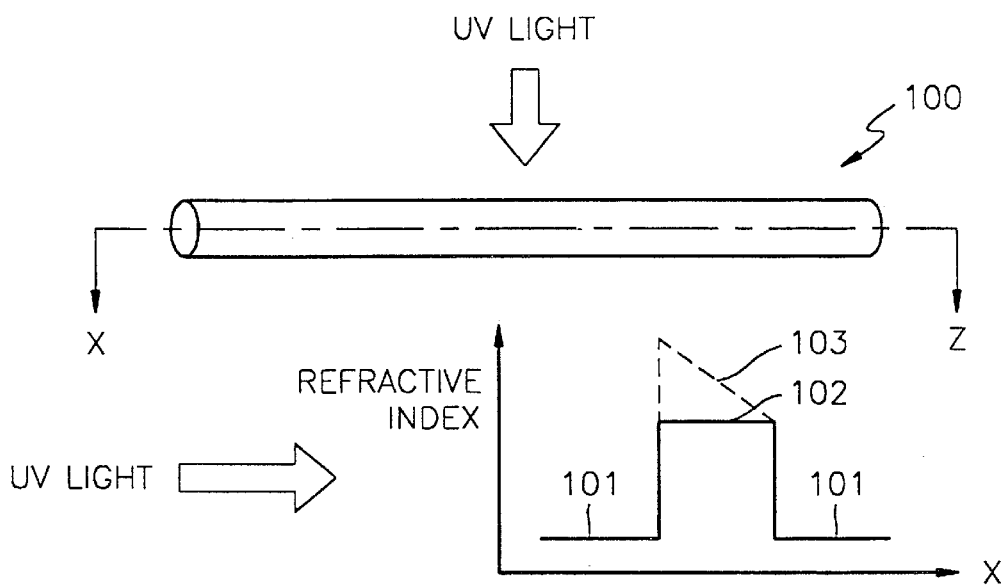
FIG. 1 is a graph showing a refractive index perturbation with respect to a direction of light irradiation when ultraviolet (UV) light is irradiated to only one side of an optical fiber.

Turning now to the drawings, FIG. 1 shows a perturbation in refractive index along the light irradiation direction, when UV light is irradiated to one side of an optical fiber. Reference numeral 100 is an optical fiber, reference numeral 101 denotes the refractive index of a cladding, reference numeral 102 denotes the refractive index of a core, to which UV light is not irradiated, and reference numeral 103 denotes the refractive index of the core to which UV light has been irradiated. As shown in FIG. 1, it can be seen that the refractive index of a core is perturbed according to the direction of irradiation of LV light.

Figure 2:
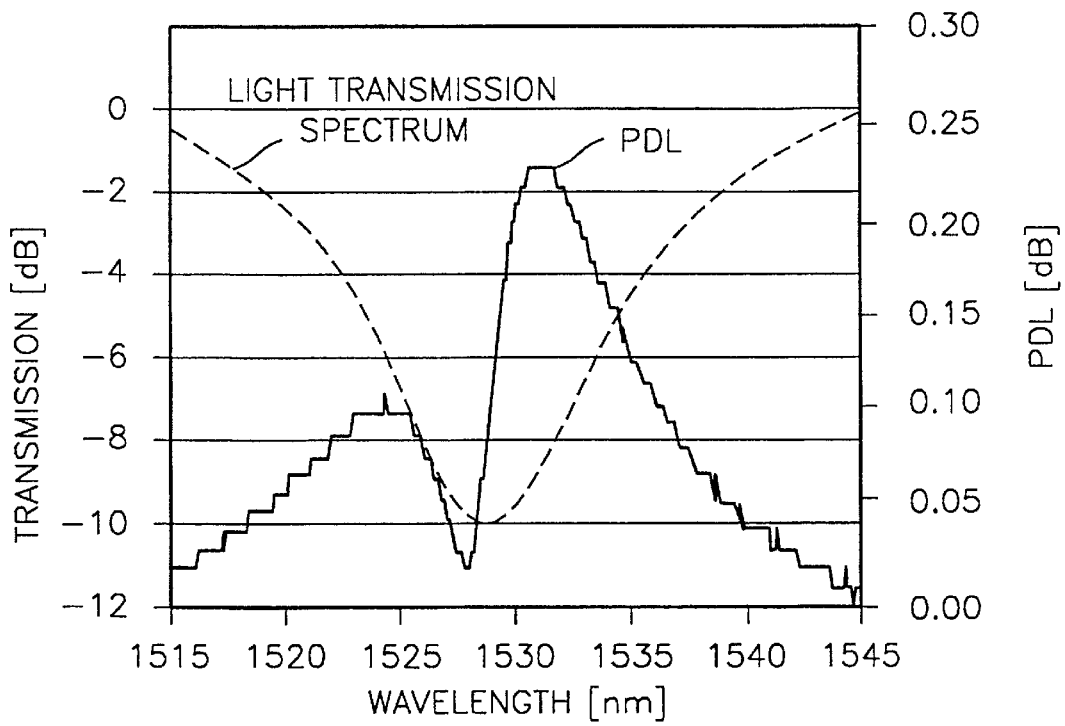
FIG. 2 is a graph showing polarization dependent loss (PDL) characteristics with respect to the wavelengths of conventional long period fiber gratings.
Figure 3:
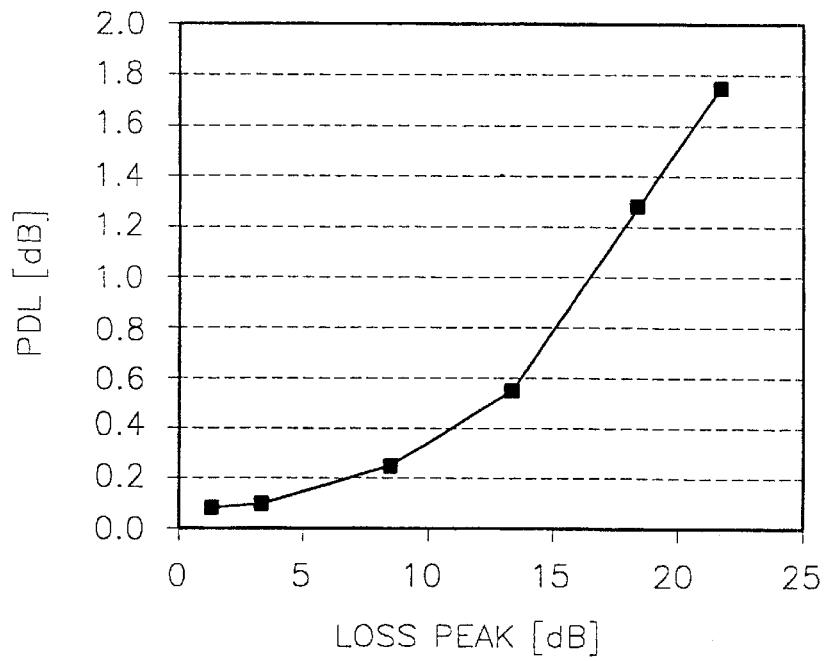
FIG. 3 is a graph showing a variation in PDL with respect to the loss peaks of conventional long period fiber gratings.

FIG. 2 is a graph showing polarization-dependent loss response characteristics with respect to the wavelengths of conventional long period fiber gratings, and FIG. 3 is a graph showing a variation in polarization-dependent loss with respect to the loss peaks of conventional long period fiber gratings. As shown in FIGS. 2 and 3, upon optical transmission, the polarization-dependent loss of long period fiber gratings increases as a loss peak increases. Therefore, a long period fiber grating with a large loss peak has a significantly large polarization-dependent loss. In order to reduce the large polarization-dependent loss, a reduction in the polarization dependence of long period fiber gratings is required.

Figure 4:
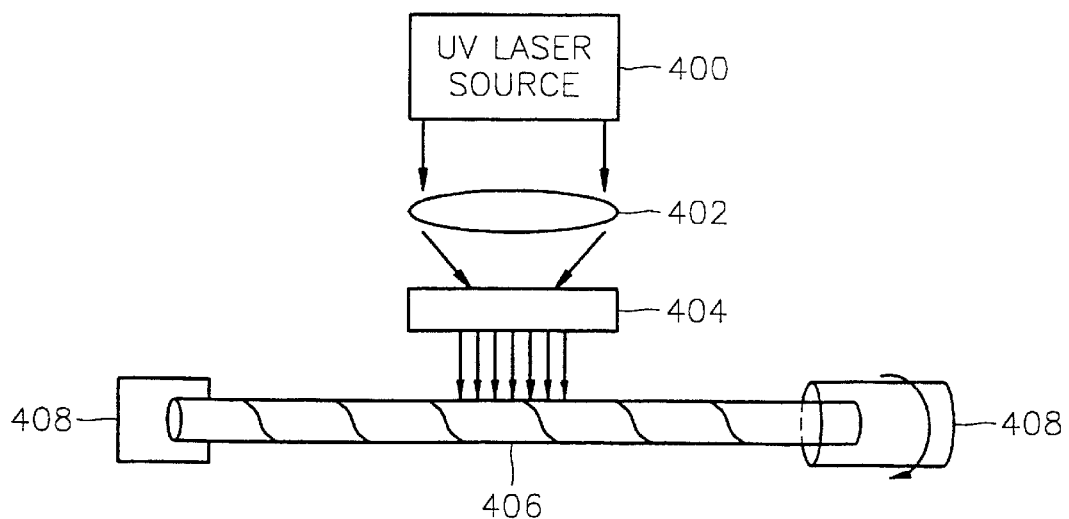
FIG. 4 is a block diagram illustrating the configuration of an apparatus for manufacturing long period fiber gratings, according to an embodiment of the present invention.

The present invention will now be described in reference to the drawings. Referring to FIG. 4, an apparatus for manufacturing long period fiber gratings according to an embodiment of the present invention includes a UV laser source 400, a lens 402, an amplitude mask 404, an optical fiber holder 408 and an optical fiber 406 twisted by the optical fiber holder 408. Preferably, one end of the optical fiber holder 408 fixes one end of the optical fiber 406, and the other end thereof is rotatable so that the other end of the optical fiber 406 can be twisted.

In the manufacture of long period fiber gratings, first, the optical fiber holder 408 fixes one end of the optical fiber 406 and rotates the other end thereof, thereby twisting the optical fiber 406. It is preferable that the entire optical fiber 406 is evenly twisted 360° in the region irradiated through the amplitude mask.

The lens 402 focuses UV light emitted from the UV laser source 400. The amplitude mask 404 has light transmission regions at periodic distance intervals, and is disposed above the optical fiber 406. Thus, the amplitude mask 404 transmits light which has been focused by the lens 402 through the light transmission regions. The transmitted light is irradiated to the twisted optical fiber 406. The irradiated light perturbs the refractive index of the core of the optical fiber 406 according to the period ($\Lambda$) of the amplitude mask 404, resulting in a grating. At this time, birefringence is induced within the optical fiber due to the refractive index perturbations of the optical fiber core. The induced birefringence perturbs the valid refractive index $n_{co}$ of the core and the coupling constant $\kappa$ of the core as shown in the following Equation 1:

$$\lambda_p = (n_{co} - n_{cl}^{(n)})\Lambda$$

$$p_{cl}^{(n)} = \sin^2(\kappa L) \quad (1)$$

wherein $\lambda_p$ denotes the peak wavelength of a long period fiber grating, $\Lambda$ denotes the period of a long period fiber grating, $n_{co}$ denotes the valid refractive index of a core, $n_{cl}^{(n)}$ denotes the valid refractive index of an n-th cladding mode, $p_{cl}^{(n)}$ denotes a coupling ratio of power to the n-th cladding mode at a peak wavelength, $\kappa$ denotes a coupling constant, and L denotes the length of a grating, so that the spectrum of a long period fiber grating varies with the polarization of incident light.

Figure 5:
FIG. 5 is a conceptual view illustrating a variation in refractive index when a twisted optical fiber is untwisted after a grating is fabricated on the twisted optical fiber.

Thus, it is required to make the optical fiber 406 immune to polarization. To do this, in the present invention, one end of the optical fiber 406 is fixed, and the other end thereof is rotated at least once so that the optical fiber is twisted 360°, as described above. When one end of an optical fiber is rotated as described above, it is important to solidly fix the optical fiber to prevent slipping within the optical fiber holder 408. Once an optical fiber is twisted, a grating is fabricated on the twisted optical fiber, the twisted optical fiber is then untwisted, and helical perturbation in refractive index appears in the core. Thus, the grating becomes independent upon the particular polarization state of light. FIG. 5 conceptually illustrates helical perturbation in refractive index when a twisted optical fiber is untwisted after a grating is fabricated on the twisted optical fiber.

Figure 6A:
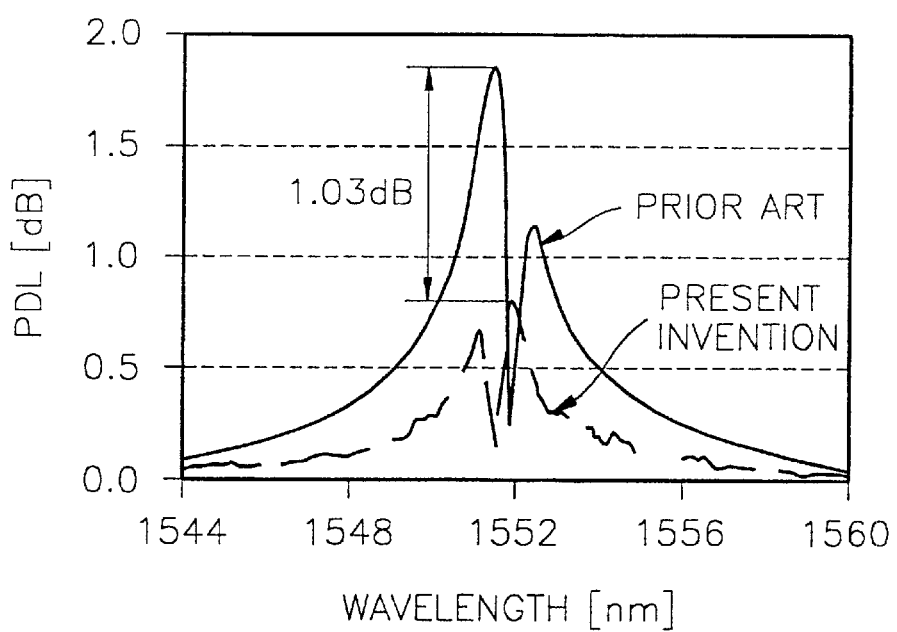
FIGS. 6A and 6B are graphs showing the results of an experiment performed with respect to a conventional long period fiber grating and a long period fiber grating according to the present invention.
Figure 6B:
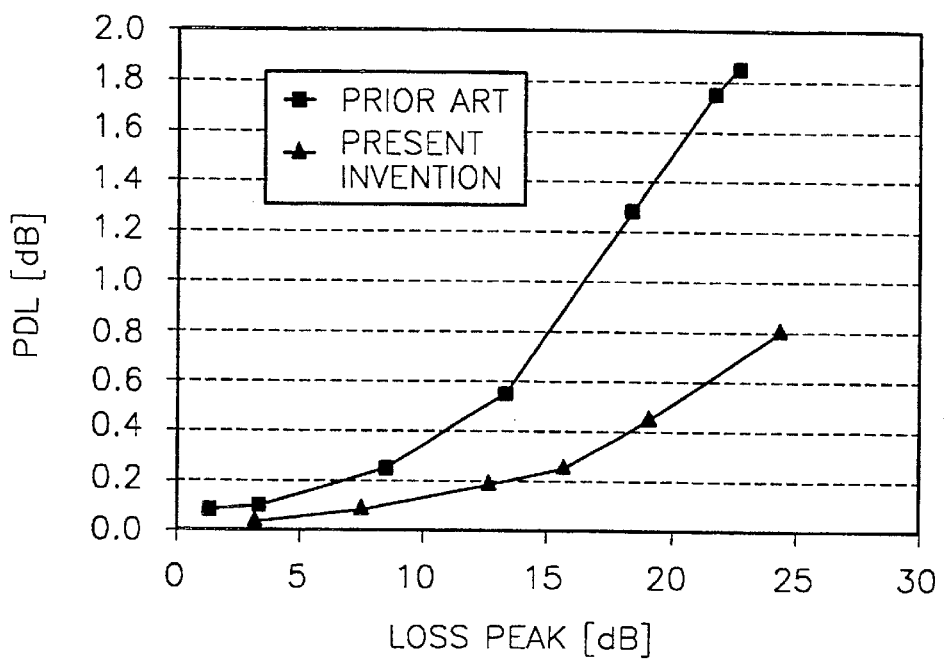

As shown in FIG. 5, it can be seen that helical perturbation in the refractive index on the cross-section of the core of the optical fiber 406 appears isotropic with respect to the total length, that is, when averaged over the length of the grating. FIGS. 6A and 6B show the results of an experiment performed with respect to a conventional long period fiber grating and a long period fiber grating according to the present invention. FIG. 6A shows the results of measurement of PDL (polarization dependent loss) with respect to the wavelength. It can be seen from FIG. 6A that the PDL in the present invention is significantly reduced compared to the PDL in the prior art within a measured wavelength range.

FIG. 6B shows the results of measurement of PDL with respect to a loss peak. In FIG. 6B, the PDL in the prior art at a loss peak of 22.1 dB (decibels) is 1.83 dB, and the PDL in the present invention at a loss peak of 24.5 dB is 0.79 dB, so that it can be seen that the PDL was reduced by 1 dB or more. It becomes evident that the PDL in the present invention generally decreases by at least 60% of the PDL in the prior art, and that the difference in the PDL between the present invention and the prior art increases as the loss peak increases.

Figure 7:
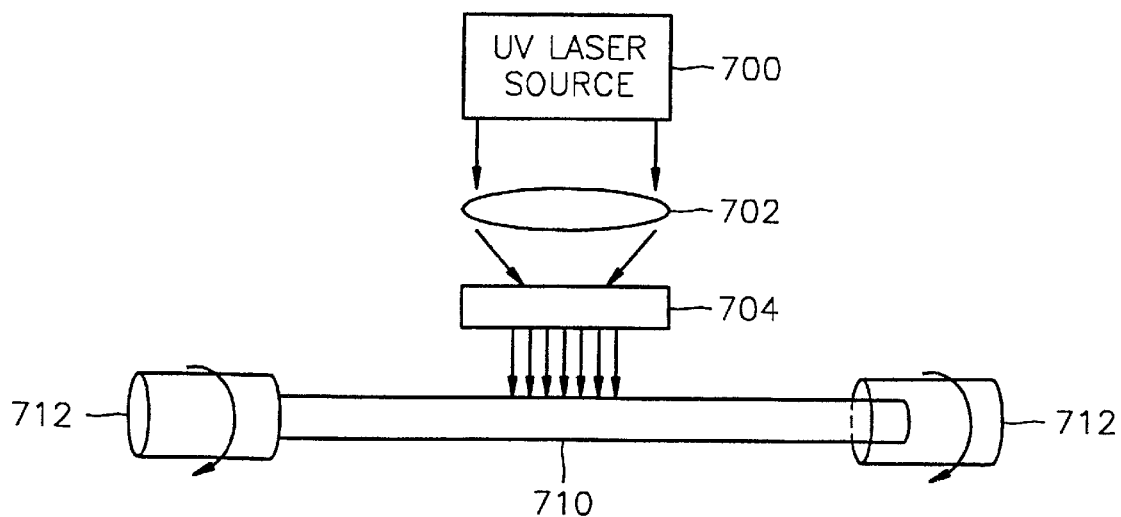
FIG. 7 is a block diagram illustrating the configuration of an apparatus for manufacturing long period fiber gratings, according to another embodiment of the present invention.

FIG. 7 is a block diagram illustrating the configuration of an apparatus for manufacturing long period fiber gratings, according to another embodiment of the present invention. The apparatus of FIG. 7 includes a UV laser source 700, a lens 702, an amplitude mask 704, an optical fiber 710 and an optical fiber holder 712.

The operations of the UV laser source 700, the lens 702 and the amplitude mask 704 are the same as those of the counterparts of FIG. 4, except that both ends of the optical fiber holder 712 for supporting both ends of the optical fiber 710 can rotate at the same speed, and thus the optical fiber 710 can rotate at a constant speed. That is, the optical fiber 710 is rotated by rotation of the optical fiber holder 712, and UV laser which has passed through the amplitude mask 704 is irradiated upon the optical fiber 710 which is being rotated, so that the refractive index profile of the core of the optical fiber 710 is isotropic in the direction perpendicular to the axis of the core, that it, in a cross-section of the core of the optical fiber 710.

Figure 8:
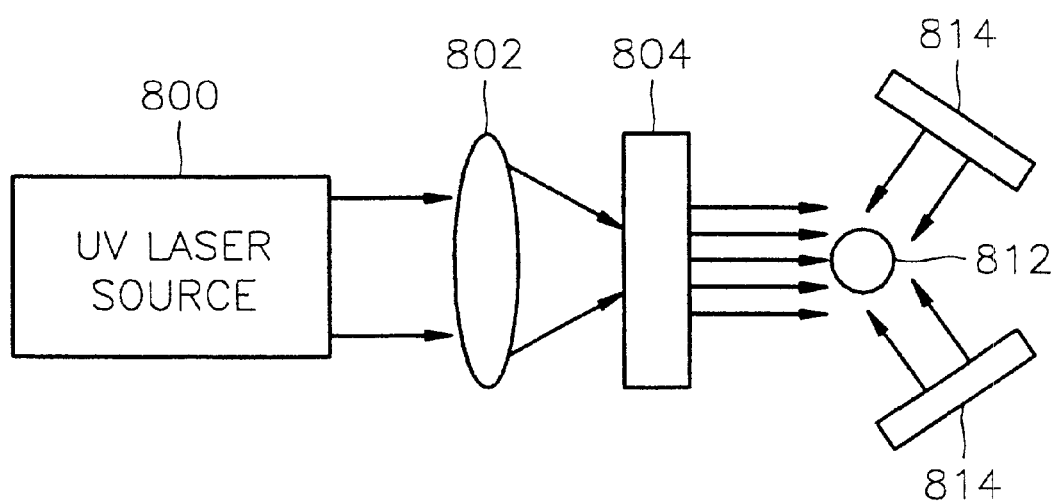
FIG. 8 is a block diagram illustrating the configuration of an apparatus for manufacturing long period fiber gratings, according to still another embodiment of the present invention.

FIG. 8. is a block diagram illustrating the configuration of an apparatus for manufacturing long period fiber gratings, according to still another embodiment of the present invention. The apparatus of FIG. 8 includes a UV laser source 800, a lens 802, an amplitude mask 804, an optical fiber 812 and reflecting bodies 814. The reflecting bodies 814 are on the opposite side of the optical fiber 812 with respect to the amplitude mask 804.

The operations of the UV laser source 800, the lens 802 and the amplitude mask 804 are the same as those of the counterparts of FIG. 4, except that when light which has passed through the amplitude mask 804 is irradiated upon the optical fiber 812, light which has passed through the optical fiber 812 is reflected by the reflecting bodies 814 and re-irradiated upon the optical fiber, such that the refractive index of the core of the optical fiber 812 changes isotropically from the viewpoint of the cross-section of the core of the optical fiber 812.

According to the present invention, in the manufacture of long period fiber gratings, the refractive index of an optical fiber core is perturbed by irradiating UV light to a twisted optical fiber or by irradiating UV light to an optical fiber while rotating the optical fiber, so that the refractive index profile of the core of the optical fiber averages out to be isotropic over the length of the grating. Therefore, a long period fiber grating which is less sensitive to polarization than that in the prior art can be obtained.

What is claimed is:

1. An apparatus for manufacturing a long period fiber grating, the apparatus comprising:

an optical fiber holder for holding a twisted optical fiber;

an ultraviolet laser for providing ultraviolet light;

a lens for focusing the light of the ultraviolet laser; and an amplitude mask for masking the focused light onto the twisted optical fiber.

2. The apparatus of claim 1, further comprising:

a twisted optical fiber held in said optical fiber holder.

3. The apparatus of claim 1, said optical fiber holder further comprising:

a fixed end for holding one end of an optical fiber; and a rotatable end for holding and twisting the other end of the optical fiber to yield the twisted optical fiber.

4. The apparatus of claim 2, said twisted optical fiber having a twist of approximately 360° in the region irradiated through the amplitude mask.

5. An apparatus for manufacturing a long period fiber grating, the apparatus comprising:

an optical fiber holder for holding an optical fiber, said optical fiber holder allowing rotation of the fiber around the fiber axis;

an ultraviolet laser for providing ultraviolet light;

a lens for focusing the light of the ultraviolet laser; and an amplitude mask for masking the focused light onto the optical fiber.

6. The apparatus of claim 5, said optical fiber holder further comprising:

a first rotatable end for holding one end of the optical fiber;

a second rotatable end for holding the other end of the optical fiber; and means for rotating said first rotatable end and said second rotatable end at the same speed.

7. An apparatus for manufacturing a long period fiber grating, the apparatus comprising:

an ultraviolet laser for providing ultraviolet light;

a lens for focusing the light of the ultraviolet laser;

an amplitude mask for masking the focused light onto an optical fiber; and a first reflecting body positioned to reflect masked light passed through the optical fiber back toward the optical fiber.

8. The apparatus of claim 7, further comprising a second reflecting body positioned at an angle to said first reflecting body, for reflecting masked light passed through the optical fiber back toward the optical fiber.

9. The apparatus of claim 8, said first and second reflecting bodies being planar mirrors.

10. A method of manufacturing a long period fiber grating, comprising the steps of:

twisting an optical fiber; and irradiating the optical fiber through a long period amplitude mask; and then untwisting the optical fiber.

11. The method of claim 10, the irradiated region of the fiber having approximately 360° of twist.

12. The method of claim 10, said step of twisting an optical fiber comprising:

placing the optical fiber in an optical fiber holder, said optical fiber holder comprising:

a fixed end for holding one end of an optical fiber; and a rotatable end for holding and twisting the other end of the optical fiber to yield the twisted optical fiber.

13. The method of claim 10, said step of irradiating the optical fiber further comprising use of an apparatus comprising:

an ultraviolet laser for providing ultraviolet light;

a lens for focusing the light of the ultraviolet laser through the long period amplitude mask onto the optical fiber.

14. A method of manufacturing a long period fiber grating, comprising the steps of:

mounting an optical fiber holder for holding an optical fiber, said optical fiber holder allowing rotation of the fiber around the fiber axis;

rotating the optical fiber; and while rotating the optical fiber, irradiating the optical fiber using an apparatus comprising:

an ultraviolet laser for providing ultraviolet light;

a lens for focusing the light of the ultraviolet laser; and an amplitude mask for masking the focused light onto the optical fiber.

15. The method of claim 14, said steps of mounting and rotating the optical fiber further comprising:

mounting one end of the optical fiber in a first rotatable end of the optical fiber holder;

mounting the other end of the optical fiber in a second rotatable end of the optical fiber holder; and rotating said first and second rotatable ends at the same rotation rate.

16. A method of manufacturing a long period fiber grating, comprising the steps of:

irradiating an optical fiber through a long period amplitude mask while reflecting light passed through the optical fiber back onto the optical fiber.

17. The method of claim 16, said step of irradiating the optical fiber further comprising use of an apparatus comprising:

an ultraviolet laser for providing ultraviolet light;

a lens for focusing the light of the ultraviolet laser;

an amplitude mask for masking the focused light onto an optical fiber; and a first reflecting body positioned to reflect masked light passed through the optical fiber back toward the optical fiber.

18. The method of claim 16, further comprising use of a second reflecting body positioned at an angle to said first reflecting body.

19. A long period fiber grating manufactured by the method of claim 10.

20. The long period fiber grating of claim 19, further characterized in having a helical perturbation of the refractive index of the core.

21. The long period fiber grating of claim 11, further characterized in having a helical perturbation of the refractive index of the core.

22. The long period grating of claim 19, further characterized in having a polarization dependent loss of less than approximately 0.79 dB at a loss peak of approximately 24.5 dB.

23. A long period grating manufactured by the method of claim 14.

24. A long period grating manufactured by the method of claim 16.

* * * * *